(12) United States Patent
Nelson et al.

(10) Patent No.: US 7,336,280 B2
(45) Date of Patent: Feb. 26, 2008

(54) COORDINATING ANIMATIONS AND MEDIA IN COMPUTER DISPLAY OUTPUT

(75) Inventors: Elizabeth K. Nelson, Seattle, WA (US); Greg D. Schechter, Seattle, WA (US); Leonardo E. Blanco, Redmond, WA (US); Matthew W. Calkins, Seattle, WA (US); Michael J. Hillberg, Beaux Arts, WA (US); Namita Gupta, Seattle, WA (US); Sriram Subramanian, Kirkland, WA (US); Kurt Jacob, Redmond, WA (US); Kenneth L. Young, Sammamish, WA (US); Patrick Mullen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 10/992,462

(22) Filed: Nov. 18, 2004

(65) Prior Publication Data
US 2006/0103655 A1  May 18, 2006

(51) Int. Cl.
*G06T 13/00* (2006.01)
(52) U.S. Cl. ....................................................... 345/473
(58) Field of Classification Search ............... 707/3; 345/473
See application file for complete search history.

(56) References Cited

U.S. PATENT DOCUMENTS

2004/0220926 A1* 11/2004 Lamkin et al. ................. 707/3
2007/0038610 A1*  2/2007 Omoigui ......................... 707/3

* cited by examiner

*Primary Examiner*—Almis R. Jankus
(74) *Attorney, Agent, or Firm*—Workman Nydegger

(57) ABSTRACT

Described is a method and system in which storyboard objects coordinate the animation of multiple elements and/or media displayed on a computer graphics display. Storyboards relate properties of elements in an element tree to a timeline, such that the properties associated with a storyboard are animated/play together as a group by starting, stopping, seeking or pausing the storyboard. Triggers, such as controlled by user interaction with the displayed information, including property triggers that change values in response to a state change, and event triggers that fire events, may cause the storyboard to start, stop, pause and seek. Storyboards may be used in XAML-based programs, and may be directly associated with elements, or indirectly associated with elements via styles. Complex properties and changeables are supported. Media playback may be controlled via storyboards, and thereby coordinated with other media playback and/or animations.

13 Claims, 7 Drawing Sheets

COORDINATING ANIMATIONS AND MEDIA IN COMPUTER DISPLAY OUTPUT

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer systems, and more particularly to the processing of graphical and other audiovisual information for display on computer systems.

BACKGROUND OF THE INVENTION

In contemporary computing systems, the development of markup language technology has resulted in a straightforward way for program authors to provide valuable information to users, and to receive requests and the like corresponding to user interaction with the displayed information. In general, the markup is processed to construct an element tree, and then the element tree is processed for rendering corresponding output data onto a display.

U.S. patent application Ser. Nos. 10/693,630 and 10/693,822 are among several patent applications (assigned to the assignee of the present invention) that among other things, describe one such markup language that is generally arranged to simplify program authoring, namely XAML (eXtensible Application Markup Language). In general, a program author uses XAML instructions along with calls to application programming interfaces (APIs) to place objects in a scene graph data structure. For example, to build a user interface, a XAML-based program generally adds child visual objects to other visual objects to build up a hierarchical scene graph, writes instruction lists such as geometry data, image data and other data for output, and may specify transform, clipping and opacity properties on visual objects.

One of the capabilities of XAML described in the aforementioned patent applications is the ability to allow programs to specify animation parameters and/or media-related data, and then efficiently output corresponding display data that includes corresponding animations and/or media. For example, a program author may describe a desired animation effect in terms of parameters, such as how much some displayed object property should change over time; for example, a rectangle's opacity property may be set to gradually fade from opaque to transparent, and then back, over some duration. In typical situations, the system manages the animation so that the program code need only specify the animation parameters initially, rather than requiring the program code itself to regularly redraw a changed image over time to accomplish the effect.

To this end, in one implementation, the operating system provides for use of a timeline object that defines the evolution of an animation over time, and as needed, a clock object is instantiated to represent the timeline for that animation. Instead of regularly calling back (e.g., once per frame) to the application program to redraw the animated image with its updated characteristics, the clock is used by the lower-level graphics components to determine the updated, time-variable property parameter or parameters for the displayed object that is being animated, and the image is then redrawn based on the updated property data. In general, media is similarly handled.

While such straightforward programming thus provides a program author with an improved and simplified way to implement animations and media as part of a user interface, timing information heretofore had to be individually applied to each animation or media element. As a result, the program author heretofore needed to manually synchronize various actions that may occur on different timelines, (e.g., the start and stop times of animations and media, and/or how events that are received are handled. This can lead to inconsistent states, such as one animated property being ahead of another animated property (at least temporarily), even though the program author would like both to be synchronized. This also adds complexity; for example, upon a restart event, the individual animations related to that event each need to be found and restarted.

SUMMARY OF THE INVENTION

Briefly, the present invention provides a method and system that allows authors to schedule sets of animations by grouping them within a named timeline object, referred to as a storyboard. In one implementation, a storyboards API set provides a way to combine timelines that affect a variety of objects and properties into a single timeline tree, enabling the program author to organize and control complex sets of timing events in a straightforward manner. Storyboards can be used on particular instances of animations/video/audio, or to animations of a particular style.

In one implementation, storyboards comprise objects that allow a timeline tree to be specified for elements in an element tree. Each timeline in the tree sets property values of elements, and controls animations for the element and its sub-tree. A storyboard essentially corresponds to a particular type of timeline object that may be started, stopped or paused, or used to seek, thereby controlling the appearance of animated elements and/or behavior of media that are associated with that storyboard.

Storyboards may also comprise a collection of top-level timelines that can be associated with an element and started independently. For example, an author may associate two different animations with an element that is in the same storyboard collection, and although those animations may be triggered independently, they are contained as a unit. Storyboards thus provide connection points between a timing tree and an element tree that allows the animations in the storyboard to resolve their targets relative to the element to which the storyboard is attached.

Storyboards also may contain a collection of triggers that can be activated by state changes, events, or other actions and contain a set of extensible actions to be executed when the trigger is activated (for instance, starting or stopping of a timeline). Storyboards are part of an underlying object model that allows the user to interactively start and stop timelines in a storyboard from code.

In general, the timelines in a storyboard represent animation templates that can be applied to various subtrees, elements, and other objects. A storyboard can be set directly onto a framework element in the tree, or applied to a framework element via a style (a resource comprising one or more data values which may be applied to an element, such as color, size and other properties of a button. Storyboards also may be used to apply animations to objects that support cloning, such as changeables, which clone original information and then operating on the cloned information, such that the original information may be restored.

Storyboards thus provide a way to combine otherwise independent timelines that affect a variety of objects and properties into a single timeline tree, enabling the program author to organize and control complex sets of timing events in a straightforward manner. For example, the separation of the timing tree and the element tree allows the author to use the timing tree to do manipulations in time, such as running a set of animations in sequence, or looping a complicated timing structure. Storyboards can be used on particular instances of animations/video/audio, or to an animation of a particular style.

A storyboard is associated with properties that enable an author to specify the object and property to animate, and a base value from which to animate. Storyboards enable the author to organize and control sets of animations as a group instead of defining the change of each animation over time individually, thereby enabling straightforward creation of animations that are synchronized with each other in complex ways, including parallel animations and sequences of animations (described below).

Storyboards allow the use of property triggers and event triggers to control their operation (e.g., start, pause, seek and stop actions). In general, a property trigger corresponds to some state/value such as true or false, whereas an event fires. For example, a property trigger may have a true value when the mouse was hovering over an element, and a false value when not hovering over it, and an event may fire when the mouse is clicked on the element. Each true or false state and/or event may be used to separately start, stop, pause, and/or seek in a storyboard (or storyboards). In this manner, animations are controllable via user interaction with the displayed element tree representation. In addition to event triggers, property enter/exit triggers are also available for use in triggering timelines.

Storyboards and triggers may be styled, wherein a style allows an author to group together data that represents one or more properties that then may be applied as a set to the corresponding properties of an element. These properties in a style may be animated and/or correspond to triggers.

Other benefits and advantages will become apparent from the following detailed description when taken in conjunction with the drawings, in which:

DETAILED DESCRIPTION

Exemplary Operating Environment

Figure 1:
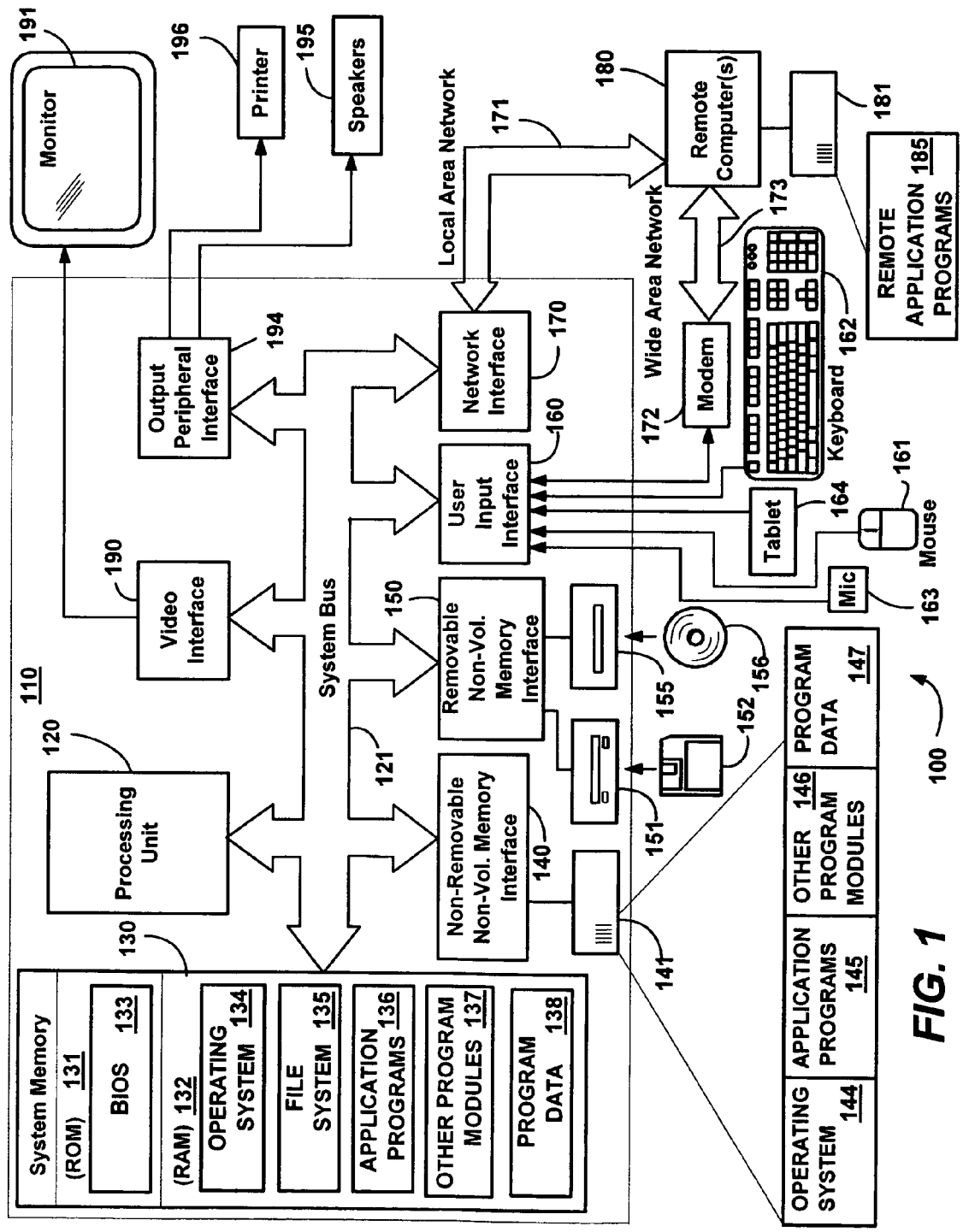
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137, and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Layered Architecture

Figure 2:
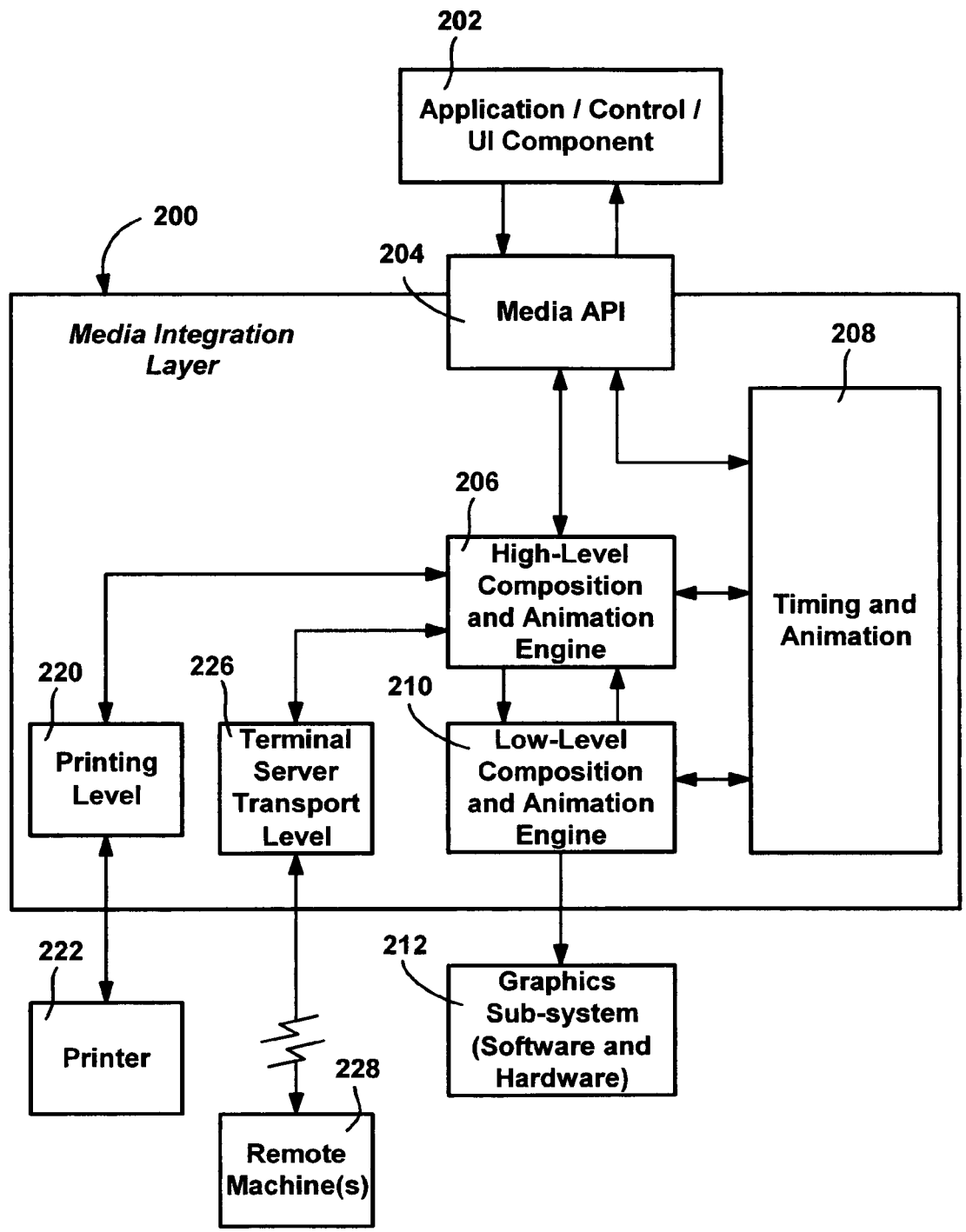
FIG. 2 is a block diagram representing a media integration layer architecture in accordance with an aspect of the present invention.

One aspect of the present invention is generally directed towards providing smooth, complex animations and/or media on computer systems. To this end, as generally presented in FIG. 2, a media integration layer architecture 200 is provided. An application program, control or other similar higher-level program code (e.g., a user interface of an operating system component) 202 accesses the media integration layer architecture 200 via a set of application programming interfaces (APIs) 204 or the like, to access (write or read) graphical information. Note that although many of the examples described herein will refer to an application program interfacing with the APIs, it is understood that other higher-level program code and components (e.g., a user interface of the operating system) will also be able to interface with the lower-level components described herein. As such, any reference to such higher-level program code, whether referred to as an application program, user interface, and so on, should be considered equivalent.

In one implementation, the media integration layer architecture 200 includes a high-level composition and animation engine 206, timing and animation components 208, and a low-level compositing and animation engine 210. As used herein, the terms "high-level" and "low-level" are similar to those used in other computing scenarios, wherein in general, the lower a software component relative to higher components, the closer the component is to the hardware. Thus, for example, graphics information sent from the high-level composition and animation engine 206 may be received at the low-level compositing and animation engine 210, where the information is used to send graphics data to the graphics subsystem including the hardware.

In general, the high-level composition and animation engine (also referred to herein as the high-level compositor and animator or the high-level engine or component) 206 builds a display element tree to represent a graphics scene provided by the application program 202, while the timing and animation components provide declarative (or other) animation and timing control. The low-level compositing and animation engine (also referred to herein as the low-level compositor and animator or low-level engine or component) 210 composes the renderings for the scenes of multiple applications, and with rendering components, implements the actual rendering of graphics to the screen. Note, that it is still possible to do time-consuming or application-specific rendering at a higher levels, and pass references to a bitmap or the like to the lower layers.

The high-level composition and animation engine 206 builds the element tree structure and traverses the structure, creating rendering instructions and simple animation intervals to be passed to the low-level compositing and animation engine 210. The rendering instructions generated by the high-level compositor may contain timing and animation information. The low-level compositing and animation engine 210 takes the rendering instructions and animation intervals and manages the animating, rendering and composing the scene that is then provided to the graphics subsystem (e.g., the graphics software and hardware) 212. Alternatively or in addition to locally displayed output, the high-level composition and animation engine 206 (or one similar thereto) may provide the rendering and animation instructions in an appropriate format to lower-level printing code 220 for sending fixed image data to a printer 222 or the like, and/or may provide rendering instructions and simple animation intervals in an appropriate format to a lower-level terminal transport server 226 for transmission to remote machines 228. Note that richer information also may be passed across the network, e.g., it may be desirable to have the remote machine handle mouse rollover effects locally, without any network traffic.

In this implementation, the media integration layer architecture 200 thus separates graphics processing into multiple levels, and each of these levels performs some intelligent graphics processing which together allows applications' user interfaces and the like 202 to output graphics with smooth animation, composite the graphics with the graphics of other applications, and work with video frames. The animation and/or compositing may also be synchronized with audio output. For example, by synchronizing audio with the frame rate at the low-level component, the timing of audio can essentially be exact with that of video or graphics, and not dependent on the ability of task-scheduled, complex pre-processing to keep up with the refresh rate.

Figure 3:
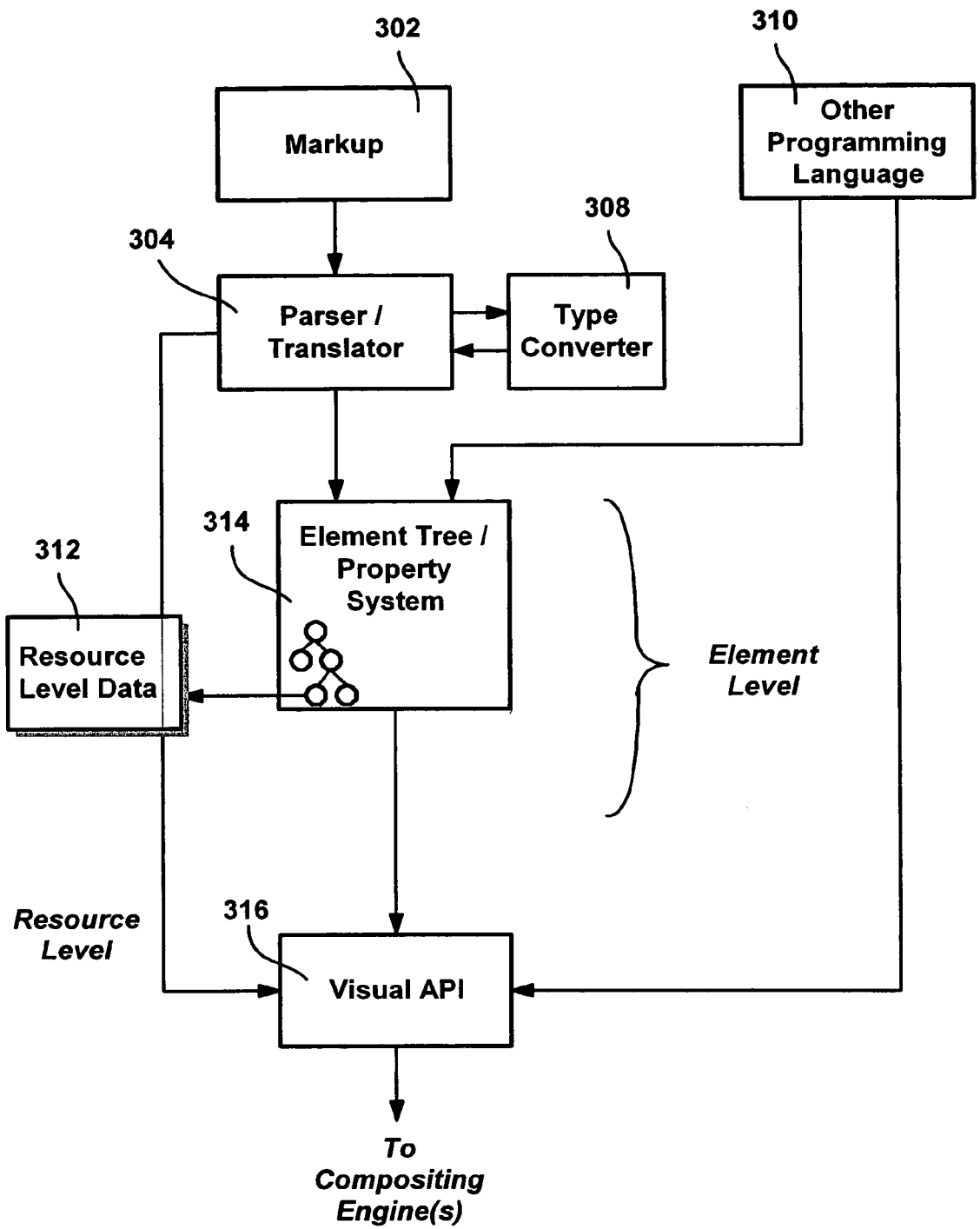
FIG. 3 is a representation of components for interpreting markup language code to interface with the visual API layer, in accordance with an aspect of the present invention.

FIG. 3 represents one implementation in which markup code 302 such as XAML-based code may be interpreted by a parser/translator 304. In general, the parser/translator 304 adds elements to the element tree/property system 314; the elements are visual objects that do their own layout. Further, note that some or all of the markup code may be compiled rather than interpreted on demand, thereby improving efficiency.

In general, an element is an object in the element layer that participates in the property system, triggering and layout/presentation system. The parser 304 finds tags and decides if those tags help to define an element or a resource object. In the special case of a VisualBrush, for example, the same tags may be interpreted as elements or also interpreted as resource objects, depending on the context of where those tags appear, e.g., depending on whether appearing in complex property syntax or not, as described in U.S. patent application Ser. No. 10/401,717.

In addition to being present inline in the markup, a resource instance may be located elsewhere (e.g., in the markup or in a file, which can be local or on a remote network and appropriately downloaded), and referenced by a name, (e.g., a text name, reference or other suitable identifier). In this manner, a scene designer can reuse an element in the element tree throughout a scene, including elements described by the complex property syntax.

The parser 304 handles markup in the complex property syntax by accessing the type converter 308 as necessary, and also by matching specified parameters to the object properties, thereby handling the complexity for the scene designer. Thus, the parser 304 does not just set up the objects, but also sets properties on the objects. Because the same rendering model is shared between the element level and the API level, many of the objects are essentially the same. This makes parsing/translation highly efficient, and also allows different types of programming languages (e.g., C#-like languages) the ability to easily convert from the markup to its own syntax, and vice-versa. Note that as represented in FIG. 3, another such programming language 310 (which may comprise compiled markup) can add elements to the element tree 208, or can directly interface with the visual API layer 316.

As also represented in FIG. 3, the same markup 302 may be used to program at an element level and a resource level. In general, the element level gives the scene designer full programmability, usage of the property system that provides inheritance (e.g., style-sheet like features), and triggering (e.g., whereby an element may have attached code to change its appearance, position and so forth in response to a user input event or action). However, the present invention also provides a resource-level mechanism by which scene designers can essentially shortcut the element tree and program directly to the visual API layer. For many types of static shapes, images and the like where element-level features are not needed, this provides a more efficient and lightweight way to output the appropriate object.

For purposes of controlling animation and media output, a timing tree comprising clocks is also maintained, as described below with reference to FIGS. 4 and 5. In general, the high-level compositor and animator engine 206 performs complex processing (sometimes referred to as compiling) that significantly simplifies the amount of processing and significantly reduces the amount of data that lower levels need to deal with to render the correct output. Note, however, that the amount and type of processing that is performed by the higher level may be dependent to a significant extent on the load, configuration and capabilities of the lower levels. For example, if high capability graphics hardware is present, the higher level may do a lesser amount of processing, and vice-versa. The high-level and low-level layers are adaptive to these factors.

In general, animation is accomplished by both the high-level compositor and animation engine 206 and the low-level compositor and animation engine 210. In one implementation, the high-level engine 206 traverses the scene and updates animation parameters with intervals for later interpolation, and packages these simplified data structures into instructions that get passed to the lower-level engine 210. This may be done in a synchronous and/or asynchronous manner. The interval data can be considered as including the timing endpoints (start and end timing data), as well as the parameterized values for the rendering instruction. Note that the high-level engine 204 can perform some or all of a requested interpolation, e.g., if an interpolation or other motion function is too complex for the lower-level engine 210 to handle, or the lower-level cannot keep up with the processing demands placed thereon, the higher-level engine can perform some or all of the calculations and provide the lower-level with simplified data, instructions, tessellations, and so on to accomplish the desired result.

In a typical case when the lower level does perform interpolations, for each frame of animation, the low-level engine 210 interpolates the parameter intervals to obtain instantaneous values, and decodes the instructions into rendering commands executed by the graphics device. The graphics device composes the final scene adding any video frames that might be present in the scene. Other data also may be added, such as content protected by digital rights management.

The high-level engine 206 thus traverses the scene datastructures, computes an interval describing each animated parameter for a period of time, and passes these intervals and simplified parameterized drawing instructions to the low-level engine 210. The parameter data includes start time, end time, interpolator and interpolation data. By way of example, instead of erasing and redrawing an image so that it appears to move, the high-level compositor and animation engine 206 can instruct the low-level compositor and animation engine 210 as to how the image should change over time, e.g., starting coordinates, ending coordinates, the amount of time (interval) that the image should move between the coordinates, and a motion function such as linear; (note that motion is not required for animation, as a stationary object may be animated by changing its color property, for example). The low-level compositor and animation engine 210 will interpolate to determine new positions between frames, convert these into drawing instructions that the graphics device can understand, and pass the commands to the graphics device. Each pass of the high-level engine 206 preferably provides sufficient data for the low-level engine 210 to perform smooth animation over several frames.

The low-level (e.g., fast-tick) engine 210 is a separate task from the high-level engine 206. The low-level engine 210 receives the simplified parameterized drawing instructions and parameter intervals describing the scene from the high-level engine 206. The low-level engine maintains and traverses these data structures until new ones are provided by the high-level engine 206. The low-level engine may service multiple high-level engines 206, maintaining separate data structures for each. The one-to-many relationship between the low-level engine 210 and high-level engine 206 allows the system to smoothly animate multiple scenes simultaneously.

The low-level engine 210 interpolates essentially instantaneous animation parameters based on the high-level engine's provided intervals, updates drawing instructions and renders the scene for every frame. The low-level engine 210 task runs at a high priority on the system, to ensure that frames are ready for presentation such as at the graphics hardware screen refresh rate. The interpolations performed by the low-level engine 210 are thus typically limited to simple, fast functions such as linear, piecewise linear, cubic spline and those of similar speed.

Figure 4:
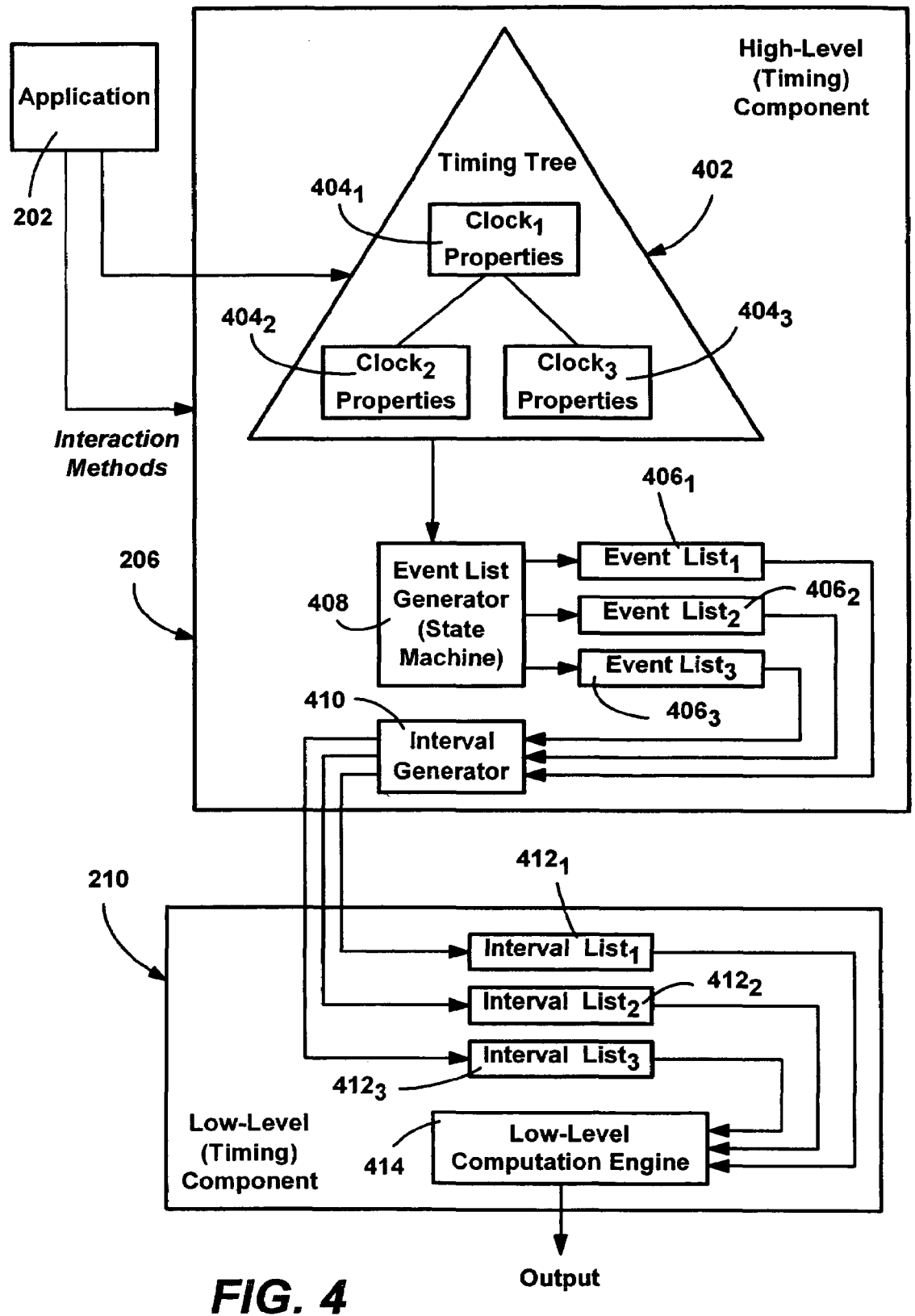
FIGS. 4 and 5 are block diagrams generally representative of a two-level architecture having timing components for converting clock property data to intervals for use in determining progress data, in accordance with an aspect of the present invention.
Figure 5:
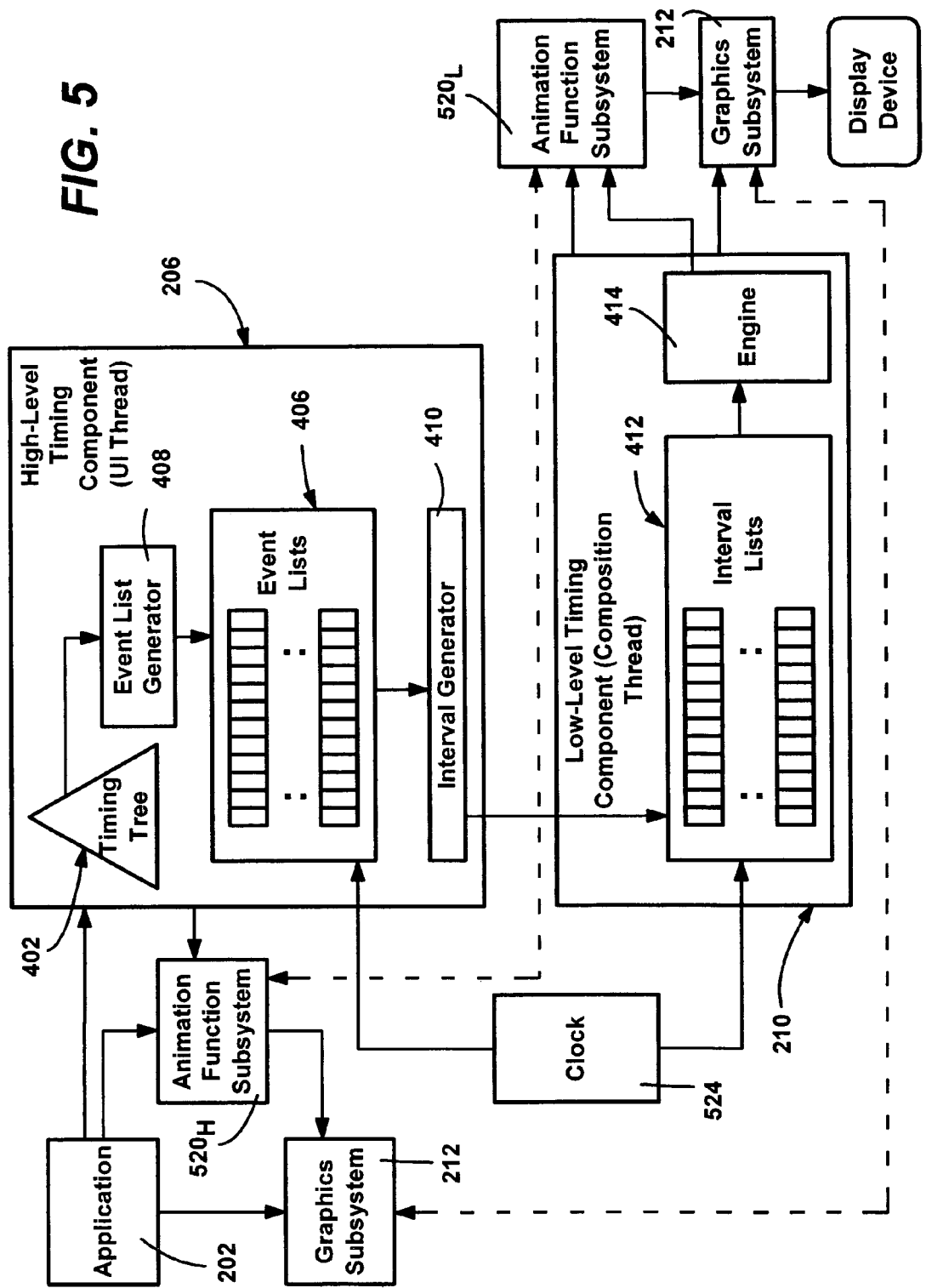

With respect to animation and media, as generally represented in FIGS. 4 and 5, a program such as the application program 202, specifies animation property values along with timing information, referred to as clocks or clock properties, to the high-level component 206. As described below, essentially any independent animation or media (e.g., linear media such as video and audio), as well as a storyboard that coordinates specified animations, will have a clock maintained for it at the high-level component. In general, the author specifies timeline data that is instantiated into the clocks as appropriate to keep them synchronized.

The clock properties comprise timing properties that define the initial synchronization relationship between a given clock and the rest of the timing structure. As shown in FIG. 5, the high-level component 206 may call high-level animation functions $520_H$ (e.g., written in managed code, which is code that provides information in the form of metadata that allows a common language runtime on which it runs to control its operation) in order to determine a current value of a property of an animation. During fast frame rate computations, the low-level component 210 calls similar (or the same) animation functions $520_L$ with the progress computed by the engine 414 in order to determine a current property value of an animation. Note that in alternative implementations, the animation functions may be built into the lower-level component, for example.

In general, animations and linear media are associated with a set of clocks which are related to each other by synchronization primitives and rules. The clocks may be hierarchically arranged, e.g., the application program has a parent clock, and animated objects of the application program are children, which in turn may have other children. When a property of a clock is defined or modified, any children of that clock are affected. For example, pausing a parent clock pauses any of its child clocks, and doubling the speed of a parent clock doubles the speed of any of its child clocks.

These clock properties may be modified by source events comprising interactive control events initiated by the application at run-time. Thus, the clocks are interactive, in that each clock can be individually started, paused, resumed and stopped at arbitrary times by the application, e.g., in response to user input. In addition, new clocks can be added to the timing structure, and existing clocks can be removed.

As described in aforementioned U.S. patent application Ser. No. 10/693,822, the high-level timing component may generate an interval list for each clock based on a stored list of events (begin, pause, and so forth) and the associated synchronization primitives. The activation intervals are straightforward, non-overlapping segments that describe the time expressed by a given clock at different points in real-world time.

As represented in FIG. 4, at least some of the clock properties may be hierarchically related in a timing tree 402 of clocks. Three such clocks with their properties are shown in FIG. 4, namely clock properties $404_1$-$404_3$, however it is understood that many more clocks and alternative timing trees may be present in a given situation. For each clock, which for example may correspond to an animated object (or set of storyboard-coordinated objects) to be displayed, the high-level component 206 includes a state machine, referred to as an event list generator 408, which generates an event list (e.g., $406_1$) from the clock properties. In general, the event list generator 408 groups the events that were initially scheduled by the specified clock properties together with any explicit interactive events, such as pause and resume requests that are received with respect to the animation, into an event list. A clock is maintained for each animation (or group of animations via a storyboard, as described below), and thus there is an event list corresponding to each independent animation/animation set, as well as one for each independent linear media.

The high-level component includes an interval generator 410 that uses the event list (e.g., $406_3$) for each animation or media to compute a corresponding interval list (e.g., $412_3$), which is passed to the low-level component 210. In turn, the low-level component 210 includes a low-level computation engine 414 that controls the output based on the current time with respect to the interval data, such as by providing a progress value based on the interval data for that object and the current time to an low-level animation function subsystem $520_L$ that determines a current value for the varying property of an animated object. For example, for any given frame, the low-level computation engine 414 interpolates the location of the animated object based on the interval data and the current time (which may be the system time or a relative time). Note that as shown in FIGS. 4 and 5, the high-level timing component includes the timing tree 402 and the event lists $406_1$-$406_3$, while the low-level timing component 210 includes the interval lists $412_1$-$412_3$, however these data structures may be maintained essentially anywhere in storage, ordinarily in high-speed random access memory.

To summarize, the high-level timing component 206 sees a tree 402 of clocks related (e.g., hierarchically) by synchronization rules and primitives. The present invention uses the clocks in the high-level timing component 206 to compile lists of activation intervals 412 that are consumed by the low-level timing engine. The low-level timing engine sees the interval lists 412, which represent independent (e.g., per-animated object or per-linear media) clocks. As shown in FIG. 5, there is a clock that provides a consistent time to both, such as the system clock 524, so that the multiple levels remain in synchronization.

In response to interactive changes received from the application 202 (or some other source), the high-level timing component needs to update the state of the clock that is directly involved with that change, as well as any that are indirectly involved as specified by the synchronization primitives. Note that it is possible that a change to a single clock can affect other clocks in the timing structure. For example, a presenter of a slide show can pause the entire display, whereby any animations and linear media currently being displayed need to be paused. As described below, in accordance with an aspect of the present invention, a storyboard allows animations and/or media to be grouped together and thus coordinated in such a desired manner.

In general, anytime that interaction occurs with respect to an object, the event list is regenerated as necessary and the interval list recomputed and sent to the lower-level timing component. The higher-level component performs these operations, (for example at a frequency on the order of six to ten times per second) such that the lower level component (e.g., operating at sixty times per second) only needs to deal with the current interval list for each animated object.

In addition to this interval information and the starting and ending values for an object, additional parameters may be sent to the higher-level component and result in changes to the interval list. For example, an application can seek to a period in time, which corresponds to an event. The application specifies when the seek is to occur, and by how much. Like rewinding or fast-forwarding media, with a seek on an animation, an application can thus jump ahead or back to a particular point in time. A reverse event is another type of scheduled or interactive event that an application may specify. When a reverse event is in the list, the progress will automatically reverse, e.g., from one-hundred percent to zero percent. Speed changes are also supported, e.g., everything below a certain clock can be set to run faster or slower than actual time. Other attributes may be specified, such as to indicate for a particular clock whether restart is allowed, and/or whether to begin again if not currently running, e.g., start at one second, begin again at ten seconds, begin again at one-hundred seconds, and so forth, but optionally do or do not restart if currently running.

Storyboards for Coordinating Animations and Media

The present invention is, among other things, directed to storyboards, which comprise objects that allow a timeline tree to be specified for an element (e.g., a FrameworkElement such as a window, panel, control such as button and so forth). The timeline sets property values of elements, and controls animations for the element and its sub-tree. A storyboard essentially corresponds to a particular type of timeline object that may be started, stopped or paused, or used to seek, thereby controlling the appearance of animated elements and/or behavior of media that are associated with that storyboard.

As will be understood, an aspect of the invention is that storyboards comprise a collection of top-level timelines that can be associated with an element and started independently. For example, as described below, the model allows an author to have a mouseOver animation and a mouseClick animation on an element that is in the same storyboard collection. The mouseOver and mouseClick animation timelines can be triggered independently, but are contained in the same unit. Storyboards also provide connection points between a timing tree and an element tree that allows the animations in the storyboard to resolve their targets relative to the element to which the Storyboard is attached. Storyboards also may contain a collection of triggers that can be activated by state changes, events, or other actions and contain a set of extensible actions to be executed when the trigger is activated (for instance, starting or stopping of a timeline). Storyboards are part of an underlying object model that allows the author to interactively start and stop timelines in a storyboard from code.

In general, the timelines in a storyboard represent animation templates that can be applied to various subtrees, elements, and other objects (e.g., text letters, words, lines, paragraphs and so forth). A storyboard can be set directly onto a FrameworkElement, or applied to a FrameworkElement via a Style (a resource comprising one or more data values which may be applied to an element, such as color, size and other properties of a button, as described below). Storyboards also may be used to apply animations to objects that support cloning, such as changeables, (e.g., brush, transform, geometry and the like, wherein changeables may be used to set properties of FrameworkElements, as described in U.S. patent application Ser. No. 10/693,438). For example, a brush is a changeable that sets the background of a button or panel by cloning the original background information and then operating on the cloned information, such that the original information may be restored. Thus, a storyboard can be used to animate a changeable that sets a property of a FrameworkElement. In other words, there are two kinds of objects related to a storyboard, namely elements that participate with the storyboard (such as FrameworkElement) and those that do not (e.g. a changeable as described above). The storyboard's algorithm/data structures are such that those that participate work as specified, but even those that do not participate work as specified, as long as they support cloning.

In accordance with an aspect of the present invention, storyboards (e.g., objects accessed via APIs) allow program authors to schedule sets of coordinated animations by grouping animations (to element properties) within timelines. In other words, a storyboard integrates the timing tree with the element tree, providing the ability to manipulate timing for different properties of different animations in a coordinated manner via the same timeline. Storyboards thus provide a way to combine otherwise independent timelines that affect a variety of objects and properties into a single timeline tree, enabling the program author to organize and control complex sets of timing events in a straightforward manner. For example, rather than having to find and restart individual animations, the grouping of animations under a timeline as part of a storyboard allows restarting all the animations at once by simply restarting the storyboard. Further, the separation of the timing tree and the element tree allows the user to use the timing tree to do manipulations in time, such as running a set of animations in sequence, or looping a complicated timing structure.

Storyboards can be used on particular instances of animations/video/audio, or to an animation of a particular style.

By way of contrast, consider the following example code written without a storyboard, and thus requires code-behind to add an interactive response, (in this example the desired simultaneous animation of two separate buttons after a mouse click). The code's author needs to make sure to set the same begin time for each button's animation, because these times need to be declared separately on each button's timeline. Note that while this code aims to animate the two buttons at the same time, there will actually be some lag between the animation of the first and the animation of the second because they are started by two separate (Begin) calls:

```
<Canvas Background="#ffffff" >
    <Button Opacity="0" Click="StartAnimations">
<Button.Opacity>
<Timeline def:ID="_timeline1" BeginTime="5">
        <DoubleAnimation To="1" Duration="1" />
</Timeline>
</Button.Opacity>
        Hello
</Button>
    <Button Canvas.Left="100" Canvas.Top="0" >
<Canvas.Top>
<Timeline def:ID="_timeline2" BeginTime="5">
```

-continued

```
        <LengthAnimation To="300" Duration="5" />
</Timeline>
</Canvas.Top>
        Hello 2
</Button>
</Canvas>
public void StartAnimations(object sender, RoutedEventArgs args)
{
_timeline1.InteractiveController.Begin( );
_timeline2.InteractiveController.Begin( );
}
```

In accordance with various aspects of the present invention, in one implementation, to use a storyboard for animation, a program author adds Timeline, an association mechanism (e.g., SetterTimeline or an attached Storyboard property), and Animation objects to the Storyboards property of a FrameworkElement. Storyboards may be applied directly to specific elements, or defined within styles (as described below). In this implementation, a storyboard has at least one SetterTimeline which is used to link one or more timelines to a specified property of a specified object. In addition to the basic timing properties of a timeline described above, a SetterTimeline has three unique properties that enable authors to specify the object and property to animate, and the base value from which to animate, namely TargetID, which targets the object animate; PropertyPath (synonymous herein with "Property" or "Path"), which targets the property to animate; and Value, an optional property which if present specifies a base value for the targeted property. Note that after the author has targeted an object and a property with the SetterTimeline, the author adds timelines and animations as its children to apply them to the targeted property.

The following example code illustrates how storyboards simplify coding and improve functionality relative to the previous example code (note that this example uses a SetterTimeline example implementation instead of an alternative implementation that operates via attached properties on a Storyboard class, as described below):

```
<Canvas Background="#ffffff" >
    <Canvas.Storyboards>
        <Timeline def:ID="myStoryboard" BeginTime="5">
            <SetterTimeline TargetID="myButton">
                <DoubleAnimation To="1" Duration="1" />
            </SetterTimeline>
            <SetterTimeline TargetID="myButton2"
                    PropertyPath="(Canvas.Top)" Value="0">
                <LengthAnimation To="300" Duration="5" />
            </SetterTimeline>
        </Timeline>
    </Canvas.Storyboards>
    <Canvas.Triggers>
<EventTrigger TargetID="myButton" Event="Click">
<TimelineBeginAction TargetID="myStoryboard" />
</EventTrigger>
</Canvas.Triggers>
<Button ID="myButton" Opacity="0">Hello</Button>
<Button ID="myButton2" Canvas.Left="100">Hello 2</Button>
</Canvas>
```

This second set of example XAML code alternatively uses a storyboard to initiate simultaneous animations on two buttons upon a click event. To this end, within a single storyboard timeline of the canvas, there is one SetterTimeline that ties one element property (an opacity property of the myButton element) to that storyboard timeline and another SetterTimeline that ties another element property (a location property of the myButton2 element) to that same storyboard timeline. A single event (clicking on myButton) triggers the storyboard to begin a coordinated animation that over time changes the opacity of myButton and the position of myButton2.

As can be seen from the contrasting code examples, the use of storyboards reduces code complexity and produces genuine coordination between the start times of the animations. In this example, both animations are started genuinely at the same time because there are no separate calls to Begin. Further, no code behind the XAML is necessary to achieve interactivity, so the author is able to write the code entirely in XAML. Moreover, with storyboards, the author only needs to set the coordinated begin time in one place, that is, on the storyboard's timeline.

Thus, storyboards enable the author to organize and control sets of animations as a group instead of defining the change of each animation over time individually, thereby enabling straightforward creation of animations that are synchronized with each other, and sequences of animations (described below). Consider the following example, which corresponds to a clock with three rectangular hands of differing widths and colors, a black-colored hour hand, green-colored minute hand and red-colored second hand that automatically displays the current system time by use of a rotate transform that sets the angle. In the example, a single storyboard timeline is used for coordinating the animation of the three hands:

```
<Canvas xmlns="http://schemas.microsoft.com/xaml/2005"
Height="100%" Width="100%" Background="White"
ID="Canvas1">
<!-- We initialize the clock hands to stand at zero degrees at midnight.
The hands appear at the current global time when displayed because they
have theoretically) continued rotating ever since midnight.   -->
<Canvas.Storyboards>
<Timeline Begin = "@12:00:00 AM"> //Set the zero-time position for the clock hands.
<SetterTimeline TargetID="hourhand" Property="RenderTransform"
SubPropertyPath="RotateTranform.Angle">
<DoubleAnimation From="0" To="360" Duration="12:0:0"
Repeat="Indefinite"/>
</SetterTimeline>
<SetterTimeline TargetID="minutehand" Property="RenderTransform"
SubPropertyPath="RotateTranform.Angle">
<DoubleAnimation From="0" To="360" Duration="1:0:0"
Repeat="Indefinite"/>
</SetterTimeline>
<SetterTimeline TargetID="secondhand" Property="RenderTransform"
SubPropertyPath="RotateTranform.Angle">
<DoubleAnimation From="0" To="360" Duration="0:1:0"
Repeat="Indefinite"/>
</SetterTimeline>
</Timeline>
</Canvas.Storyboards>
<Rectangle ID="secondhand" Fill="Red" Top="0" Left="50"
Height="50" Width="2">
<Rectangle.RenderTransform>
<RotateTransform Center="0 50"/>
</Rectangle.RenderTransform>
</Rectangle>
<Rectangle ID="minutehand" Fill="Green" Top="0" Left="50"
Height="50" Width="3">
<Rectangle.RenderTransform>
<RotateTransform Center="0 50"/>
</Rectangle.RenderTransform>
</Rectangle>
<Rectangle ID="hourhand" Fill="Black" Top="0" Left="50"
Height="50" Width="4">
<Rectangle.RenderTransform>
```

-continued

```
<RotateTransform Center="0 50"/>
</Rectangle.RenderTransform>
</Rectangle>
</Canvas>
```

Upon running the above code, via the render transform property and rotate transform angle sub-property, a time manager automatically calculates the rotation amount of each hand based on the current time, (since 00:00:00 in the year 0 AD where the hands were known to be at angle zero degrees) and the updated angles used when rendering. Each new animation calculation updates the hands' angular position, e.g., once per frame or at some other rate. All three hands start together, and all three would stop together, if, for example, some event (not shown in the above example code) stopped the clock.

As can be readily appreciated, the complexity of the animation of element properties can be significant, as for example, multiple SetterTimelines may be grouped under a single storyboard timeline, with each SetterTimelines in turn referring to different target elements and properties of those elements. Storyboards can combine; for example, one storyboard can associate a transform with an element and another can set a value for that transform, (although the ordering in the code needs to be correct so that the transform exists before the value is set). Nevertheless, the use of storyboards makes it straightforward for authors to lay out the desired elements, properties and animation behavior.

Figure 6:
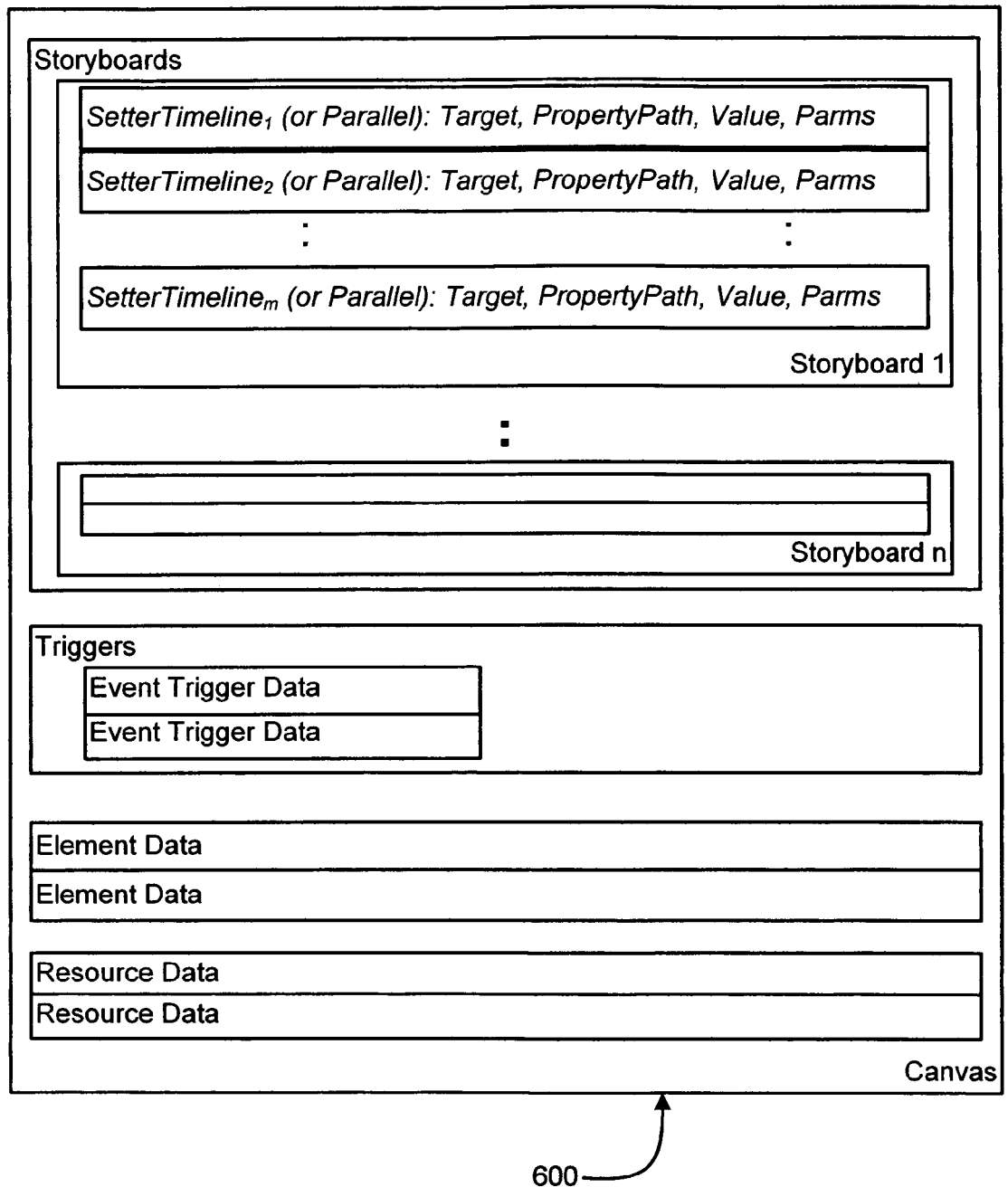
FIG. 6 is a representation of how storyboards can be arranged in code to relate timelines to an element tree elements, in accordance with an aspect of the present invention.

FIG. 6 is a general representation of how such code may be arranged, with a canvas having a set of storyboards (e.g., $Storyboard_1$-$Storyboard_n$), with each storyboard of the set (e.g., $Storyboard_1$) comprising a timeline with possibly multiple SetterTimelines, e.g., $SetterTimelines_1$-$SetterTimelines_m$ (or with equivalent element tree association mechanisms such as a ParallelTimeline with properties, described below). The canvas also may include event trigger information, also described below, and information about elements and resources (such as style and file identifiers) associated with the storyboard as the targets having animated properties.

As can be readily appreciated, alternative ways to implement various aspects of the present invention are feasible. For example, instead of using a SetterTimeline, an alternative association mechanism specifies similar association information via attached properties on a Storyboard class. Note that this facilitates the incorporation of media into storyboards. Example XAML for this alternative is shown below:

```
<Canvas.Storyboards>
    <MediaTimeline Source = "my.wmv" Storyboards.TargetID = "myvideo">
        <ParallelTimeline Storyboard.TargetID="myButton"
    Storyboard.Property="Width" Storyboard.Value=...>
            <LengthAnimation .../> //no SB.TargetID on nested targets
        </ParallelTimeline>
        <LengthAnimation Storyboard.Property=" . . . " Storyboard.
    </Canvas.Storyboards
    <Video ID= . . .  // etc.
```

Note that in the above example, there is a MediaTimeline for associating some media file (my.wmv) with a storyboard, and a ParallelTimeline in which the storyboard properties are set (with some ellipses shown for purposes of simplicity). Note that a "ParallelTimeline" is essentially a storyboard timeline as previously understood, with a varied name to distinguish it from other types of timelines, including the MediaTimeline (above) and a SequentialTimeline (described below). However, the ParallelTimeline also eliminates the need for a SetterTimeline by the use of properties for the storyboard, e.g., Storyboard.Property, Storyboard.Value and Storyboard.Target (instead of TargetID, PropertyPath and Value of a SetterTimeline), although this tends to make attached properties long and not very discoverable. In general, storyboard properties may be attached to any timeline, as long as for each storyboard, there is some target property (e.g., TargetID), other storyboard properties are on the same timeline as the TargetID, and there are no nested Targets. Note that if no TargetID is specified, it is assumed that the target is the element that hosts the storyboards, e.g. the Canvas in the previous example. For media, MediaTimelines do not specify a Storyboard. Property or Storyboard.Value.

The following table describes an example Storyboard class and its object properties and methods:

```
Public static class Storyboard
{
// Dependency Properties
    public static readonly DependencyProperty TargetIDProperty;
    public static readonly DependencyProperty ValueProperty;
    public static readonly DependencyProperty PropertyPathProperty;
    public static readonly DependencyProperty SubPropertyPathProperty;
// Static Methods
    public static void SetTargetID(DependencyObject d, String targetID);
    public static string GetTargetID(DependencyObject d);
    public static void SetValue(DependencyObject d, String targetID);
    public static string GetValue(DependencyObject d);
    public static void SetPropertyPath(DependencyObject d, String targetID);
    public static string GetPropertyPath(DependencyObject d);
    public static void SetSubPropertyPath(DependencyObject d, String targetID);
    public static string GetSubPropertyPath(DependencyObject d);
}
```

Other alternatives for associating the element tree with a storyboard's timeline tree are shown in the XAML examples below:

```
<Canvas.Storyboard>
    <SetterTimeline>
        <SetterTimeline.Value>
            <MediaTimeline>
        </SetterTimeline.Value>
    </SetterTimeline>
    <SetterTimeline Storyboard.Target="myButton" Property="Width"
    Value=...>
        <LengthAnimation ... />
    </SetterTimeline>
</Canvas.Storyboards>
<Video ID= . . .  // etc.
```

Note that in this above alternative, the MediaTimeline is not a child of the SetterTimeline, but should be, to be part of a timeline tree, not a value on a timeline. Thus, this is generally a less desirable syntax.

```
<Canvas.Storyboard>
    < MediaSetterTimeline>
        <MediaTimeline Source = "my.wmv" TargetID = "myvideo">
    </MediaSetterTimeline>
    <SetterTimeline TargetID="myButton" Property="Width" Value=...>
        <LengthAnimation ... />
    </SetterTimeline>
</Canvas.Storyboards
<Video ID= . . .  // etc.
```

Note that the above alternative adds another class, MediaSetterTimeline.

```
<Canvas.Storyboard>
    <SetterTimeline TargetID="myvideo" Property="Source" >
        <MediaTimeline Source = "my.wmv" >
    </SetterTimeline>
    <SetterTimeline TargetID="myButton" Property="Width" Value=...>
        <LengthAnimation ... />
    </SetterTimeline>
</Canvas.Storyboards>
<Video ID= . . .  // etc.
```

This above alternative follows the animation pattern, but tends to be confusing because the value and the child want to be the value of the same property, and also because it allows a MediaTimeline to be put on the width. Notwithstanding the numerous alternatives that are possible, for purposes of explanation, in general, the other examples herein will be described via use of a SetterTimeline.

In one implementation, storyboards may be a timeline collection property on FrameworkElement; the timeline collection is instantiated into a clock on the element, when first applied to the element. The values in the Storyboards properties are timeline instances, e.g., IList<Timeline>, with the leaves of each the timeline hierarchies being SetterTimeline (used in one implementation to set a property's base value) or the like, or animation instances (used to modify the base value), with the animations under a SetterTimeline in this implementation. SetterTimeline is a Timeline, and thus can have children, however in one implementation the only legal child of a SetterTimeline is an Animation.

Note that the Storyboards property is not a dependency property. Each of the timeline instances in the storyboards property potentially represents a hierarchy. These timeline hierarchies are instantiated into TimelineClock hierarchies, and stored internally on the host FrameworkElement. These individual clock instances can then be obtained using a FindStoryboardClock API which takes a Timeline as an input (required to be one of the timelines from the storyboards), and uses it to find the associated clock.

In a current implementation, storyboards are processed when the ISupportInitialize.EndInit is called on the host framework element. Once the storyboards have been processed, the FrameworkElement.Storyboards may be made read-only, to help reflect the fact that changes will not be processed.

As described above, SetterTimeline is a timeline for specifying a property, which may be implicitly targeted to the host FrameworkElement or to a target FrameworkElement if specified, and optionally a value. If specified, the TargetID is a reference to a FrameworkElement ID in the host FrameworkElement's descendency. The Path (synonymous herein with PropertyPath) property on SetterTimeline describes which property is being animated via the storyboard, and is required.

The Value property of SetterTimeline is also optional. If specified, it indicates a base value that the property should take when the Timeline is active. This base value is used when there is no animation, or when the animation needs an implied value. The base value may equivalently come from a local value (set directly on the element), from inheritance, from styling, and so forth. For example, the following animates a property from a value of 10 to 20:

```
...
    <SetterTimeline PropertyPath="..." Value="10">
    <LengthAnimation To="20"/>
    </SetterTimeline>
...
```

Note that if the LengthAnimation above specified both From and To values, the base value (SetterTimeline.Value) would be ignored.

In one implementation, the target needs to be a reference to a FrameworkElement, in the same tree as the host FrameworkElement of the Storyboards property. The first component of the PropertyPath needs to be a dependency property-backed property. For example, Window.WindowAutoLocation is not storyboard-able, because it is not a dependency property.

A property may be an item in an indexed collection. The PropertyPath (or Path) attribute on SetterTimeline may "dot down" into an object, with a special case that attached properties are wrapped in parentheses. For example, if "brush" is a Brush, the following property path accesses the alpha on a color of a stop of a linear gradient brush:
    brush.Stops[1].Color.A
while the following path accesses the docking attached property on an element:
    button.(DockPanel.Dock)

Note that the above property path is in attached property syntax, but is not actually an attached property. That is, BackgroundProperty is defined on Button itself, with common language runtime property accessors on button, as opposed to a traditional attached property, which would have static Set/Get method accessors. This is necessary, because at compile time, TargetID cannot be resolved to a particular type, so it is unknown to what class the "Background" property resolves.

PropertyPath is defined as follows:

```
public sealed class PropertyPath
{
    public PropertyPath(string path, params DependencyProperty[ ] pathParameters);
    public PropertyPath(DependencyProperty dependencyProperty);
    public string Path { get; set; }
    public DependencyProperty[ ] PathParameters { get; set; }
}
```

Complex property paths, namely those with more than one component specified, are described below.

In accordance with an aspect of the present invention, in addition to integrating a timing tree with an element tree, storyboards allow the use of property triggers and event triggers to control their operation (e.g., start, pause, seek and stop actions). In general, a property trigger corresponds to some state/value such as true or false, whereas an event fires (and thus does not have a false value). For example, a property trigger may have a true value when the mouse was hovering over an element, and a false value when not hovering over it. Each true or false state may be used to separately start, stop, pause, and/or seek in a storyboard (or storyboards). An event, such as a mouse click on an element, fires and thus does not have a variable state, but likewise may control a storyboard's operation. In this manner, animations are controllable via user interaction with the displayed element tree representation.

Triggers is a collection property on FrameworkElement. The trigger can specify actions, including SetAction and TimelineAction. SetAction specifies the value of a property. TimelineAction manipulates a timeline in the Storyboards property.

By way of example, the following gives a button a special background on mouse-over:

```
<Window.Triggers>
    <PropertyTrigger TargetID="button" Property="IsMouseOver"
        Value="true">
        <SetAction Path="(Button.Background)" Value="red"/>
    </PropertyTrigger>
</Window.Triggers>
<Button ID="button">OK</Button>
</Window>
<Window>
```

TriggerAction and SetAction are defined as:

```
abstract class TriggerAction
{
}
class SetAction : TriggerAction
{
    String TargetID {get; set; }
    DependencyProperty Property {get; set; }
    PropertyPath Path{ get; set; }
    Object Value {get; set; }
}
```

Note that SetAction follows the pattern of a SetterTimeline, but SetAction is not a Timeline.

TimelineAction is an abstract class, with subclasses for each of the verb methods on a TimelineClock:

```
abstract class TimelineAction : TriggerAction
{
    Timeline TargetID {get; set; }
}
class BeginInAction : TimelineAction
{
    int Offset {get; set; }
}
...
```

The TargetID of a TimelineAction is a string, where the string is resolved within the current scope, and is resolved to a timeline.

As described above, in addition to property triggers there are event triggers, wherein an event trigger takes as its source an event that causes actions to occur when that event fires on the host element. Note that, unlike property triggers, an event trigger is not scoped; it performs an operation, then that operation determines its own lifetime. For example, one event may start a timeline, and that timeline may run until its duration completes, or until another event trigger or the like stops it.

The following generally describes a trigger:

```
class Trigger
{
    TriggerActionCollection TriggerActions {get;}
}
class PropertyTrigger : Trigger
{
    String TargetID {get; set;}
    DependencyProperty Property {get; set;}
    PropertyPath Path {get; set;}
    Object Value { get; set; }
}
class EventTrigger : Trigger
{
    String SourceID { get; set; }
    RoutedEventID Event { get; set; }
}
```

Using an event trigger in conjunction with an associated timeline, the following example code shows timeline-controlled content being manipulated with "on" and "off" buttons:

```
<Window>
    <Window.Storyboards>
        <SequentialTimeline ID="myTimeline" >
            <SetterTimeline TargetID="foo" .../>
            <SetterTimeline TargetID="bar" .../>
            . . .
        </SequentialTimeline>
    </Window.Storyboards>
    <Window.Triggers>
        <EventTrigger SourceID="b1" Event="Click">
            <BeginInAction TargetID="myTimeline" Offset="0"/>
        </EventTrigger>
        <EventTrigger SourceID="b2" Event="Click">
            <EndInAction TargetID="myTimeline" Offset="0"/>
        </EventTrigger>
    </Window.Triggers>
    <DockPanel>
        <DockPanel DockPanel.Dock="Top">
            . . . (content) . . .
        </DockPanel>
        <Button ID="b1" DockPanel.Dock="Left">Start</Button>
        <Button ID="b2" DockPanel.Dock="Right">Stop</Button>
    </DockPanel>
</Window>
```

Note that the above code uses a sequential timeline, rather than independent timelines. A sequential timeline has its child timelines triggered in sequence, e.g., some storyboard corresponding to "bar" (not shown) is triggered upon the completion of "foo" and not on any program-specified time data.

In addition to event triggers, property enter/exit triggers are also available for use in triggering timelines, as generally shown in the example below:

```
<PropertyTrigger Property="MouseOver" Value="True">
    <PropertyTrigger.Enter>
        <BeginInAction Offset="0" TargetId="myTimeline"/>
    </PropertyTrigger.Enter>
    <PropertyTrigger.Exit>
        <EndInAction Offset="0" TargetId="myTimeline"/>
```

-continued

```
    </PropertyTrigger.Exit>
</PropertyTrigger>
```

In accordance with another aspect of the present invention, storyboards and triggers may be styled, (although not entirely like dependency properties, as Storyboards is not itself a dependency property). In other words, as described above, a Style allows an author to group together data that represents one or more properties, which may then be applied as a set to the corresponding properties of an element; these properties in a Style may be animated and/or correspond to triggers. For example, applying the following Style will style the buttons on a page to sequentially flash between red and blue:

```
<DockPanel>
    <DockPanel.Resources>
        <Style>
            <Button/>
            <Style.Storyboards>
                <SequentialTimeline RepeatDuration="Indefinite">
                    <SetterTimeline
                        Path="(Button.Background)"
                        Value="Red"
                        Duration="1"/>
                    <SetterTimeline
                        Path="(Button.Background)"
                        Value="Blue"
                        Duration="1"/>
                </SequentialTimeline>
            </Style.Storyboards>
        </Style>
    </DockPanel.Resources>
    ...
</DockPanel>
```

As is understood, with the ability to control the values of element properties from different mechanisms, including triggers, timelines, storyboards, locally set values in the markup and others, conflict resolution between property values needs to be handled to determine what a property value should be. For example, values set as part of the Storyboards property override values set locally on elements. There is thus a priority of property values on a particular FrameworkElement, starting with the Triggers property as the highest priority. Note that if multiple triggers attempt to set the same property, last-writer-wins rules apply, e.g., in the markup case, the trigger that occurs last in the markup has its value applied.

The Storyboards property has the next highest priority, with again a last-writer-wins solution should multiple storyboard setters try to set the same property. The last-writer is interpreted using a depth-first walk of the timeline tree.

Values set locally on the element are next, (e.g., FrameworkElement.SetValue). Styles generally follow next with the same priority ordering within a style, that is, Style triggers (again with last-writer-wins if a conflict at the same level), then Style Storyboards, then Style target-type values.

Turning to an explanation of complex property paths, it is possible for a setter to modify not only the property on a target, but in some situations one of the target's sub-properties. In general, complex properties are handled by first establishing what the property value is for an element, and then dotting down into that property for animation. For example, the following code exemplifies a red rectangle that repeatedly and gradually fades in and out by animating the opacity:

```
<Window>
    < Window.Storyboards>
        <SetterTimeline TargetID="rectangle" Begin="0"
            RepeatDuration="Indefinite"
            PropertyPath="(Rectangle.Fill) .
            (SolidColorBrush.Opacity)" />
            <DoubleAnimation From="0" To="1"
                Begin="0" Duration="5" AutoReverse="true"/>
        </SetterTimeline>
    </Window.Storyboards>
    <Rectangle ID="rectangle" RectangleWidth="100"
        RectangleHeight="100" Fill="Red" />
</Window>
```

In one implementation, the first component of the property is required to be a dependency property (e.g., the Background that is being filled in the example above). The type of that dependency property is also required to be a Changeable, because of the need to clone a copy so that the cloned copy may be modified; (alternatives include a deep cloning solution, or to keep it as a template). Note that this works because styles and Storyboards/Triggers are still fundamentally dependency property-based. If anything related to the Button.Background changes, the whole background value is recalculated.

Thus, in the above example, a copy of the solid color brush is first made and stored on the rectangle instance. Internally, the local value is not actually replaced, because the value needs to be preserved, for when the trigger deactivates. Second, the trigger is executed onto that copy, as if replaying a script.

The property invalidation algorithm thus occurs in two passes, namely a first pass that triggers invalidation of properties, just as if there is no complex property path, and a second pass in which triggers with a complex property path (i.e., with a dot in it) invalidate only the base dependency property.

To animate, the property value calculation algorithm uses the normal search algorithm to find the base property value, while ignoring any value that has a complex property path on it. Second, the algorithm finds the applicable triggers and setters with complex property paths, and applies them to the base value from above. This may require making a copy of the Changeable, which may be optimized by sharing the value whenever possible; a copy is only made when necessary.

Using complex property paths requires maintaining consistent clocks across the property rebuilding. For example, the following markup code shows a button that gets a linear gradient brush background from a storyboard, where the first stop is modified by one property trigger (when the mouse is over the button), and the second stop is modified by a second trigger (when the button is pressed):

```
<Window>
    < Window.Resources>
        <Style>
            <Button/>
            < Style.Storyboards>
                <SetterTimeline Start="0" Duration="60"
                    Path="(Button.Background)">
                    <SetterTimeline.Value>
                        <LinearGradientBrush>
                            <GradientStop Color="#FF000000"/>
                            <GradientStop Color="#00FF0000"/>
                        </LinearGradientBrush>
                    </SetterTimeline.Value>
                </SetterTimeline>
            </ Style.Storyboards>
            <Style.VisualTriggers>
                <PropertyTrigger Property="IsMouseOver" Value="true">
                    <SetAction
                        Path="(Button.Background) .Stops[0]"
                            Value="#80000000"/>
                </PropertyTrigger>
                <PropertyTrigger Property="IsPressed" Value="true">
                    <SetAction Path="(Button.Background) .Stops[1]"
                        Value="#00800000"/>
                </PropertyTrigger>
            </Style.VisualTriggers>
        </Style>
    </ Window.Resources>
    <Button>OK</Button>
</ Window>
```

In this example, during the first minute, the background of the button is a linear gradient, from red to green. When the mouse goes over the button, the brush changes to a linear gradient from pink to green. When the mouse button is pressed, the color varies linearly from pink to light green, until a time when the mouse button goes back up, at which moment the background changes back to the pink to green linear gradient brush. When the mouse leaves the button, the background returns to the red to green linear gradient. Note that it is feasible to have complex property paths in a SetAction object.

A first step to accommodating this scenario is to store the clocks on the styled parent element when the style is applied (i.e. during OnStyleInvalidated). This allows the same clocks to be re-used when a property is rebuilt. A second step is to ignore property path errors; that is, after the first minute, when the timeline goes inactive, the button no longer has a linear gradient brush. At that point, the triggers which modify the stops no longer make sense, and (consistent with data binding) are silently ignored.

From the Storyboards property, each Timeline tree is instantiated into a TimelineClock tree, stored internally on the same FrameworkElement that hosts the Storyboards. For each setter and animation clock, the targeted element also is given a reference to the clock. For each setter clock, the targeted element listens to active/inactive events on the clock, each of which triggers an invalidation of the property. For each animation clock, the clock is incorporated into the target element's animation clock list for the property.

Figure 7:
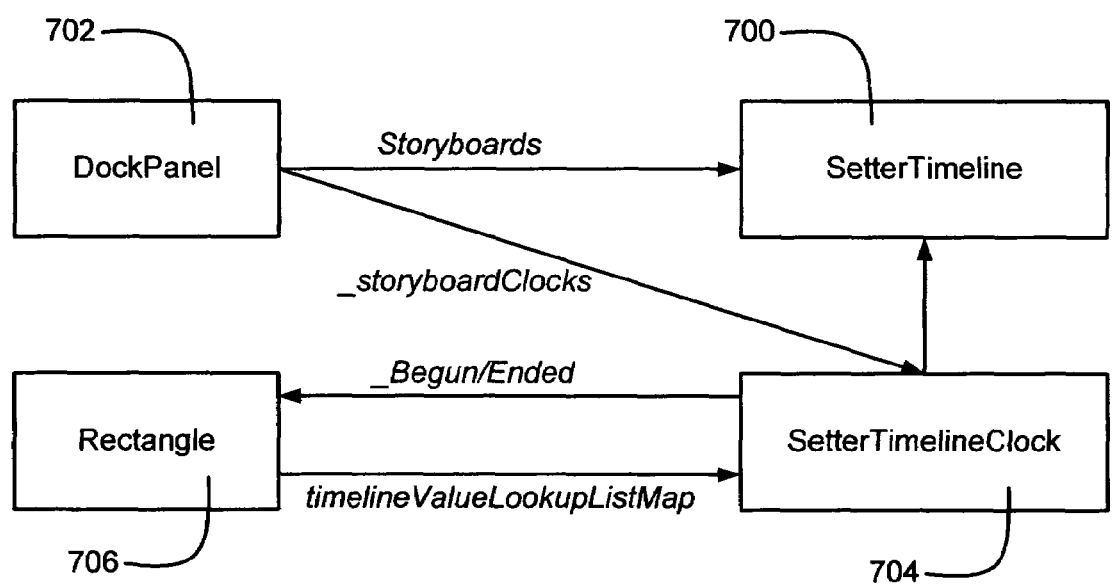
FIG. 7 is a representation of relationships among data structures including a clock instantiated to represent a storyboard timeline, in accordance with an aspect of the present invention.

FIG. 7 provides an example of the steps and data structure updates when a storyboard is set and processed on an element. In general, FIG. 7 shows the objects and references for the following simple SetterTimeline example:

```
<DockPanel>
    <DockPanel.Storyboards>
        <SetterTimeline TargetID="_rectangle"
            Path="(Rectangle.RectangleWidth)"
            Value="10"
            Start="0"End="10"/>
    </DockPanel.Storyboards>
    <Rectangle ID="_rectangle" RectangleHeight="10"/>
</DockPanel>
```

Initially, one or more Timeline instances are added to the DockPanel's Storyboards property, e.g., by calling DockPanel.Storyboards.Add(new SetterTimeline( . . . )).

When the DockPanel's ISupportInitialize.EndInit is called, the storyboards (e.g., corresponding to the SetterTimeline 700 of the DockPanel 702 in FIG. 7) are processed such that each of the timelines in Storyboards is instantiated into a clock (e.g., labeled 704 in FIG. 7) via TimelineClock.CreateFromTimeline, and stored privately on the FrameworkElement, (e.g., the rectangle 706 in FIG. 7).

The target of each setter is given a reference to the clock that is associated with the affected dependency property. The target also sets listeners on the clock boundary events such as (Begun and Ended). Any animations under the setter are added to the target's animation list (via FrameworkElement.GetAnimationClocks).

When the style is set on the FrameworkElement (each FrameworkElement), clocks are instantiated from the Timeline hierarchies in the Style.Storyboards collection. For setters targeting the styled parent, the FrameworkElement maintains references to the clocks (associated with the associated dependency property), and the styled parent sets listeners on the Begun/Ended events for the clock. For setters targeting elements in the Style.VisualTree, similar references/listeners are set when the FrameworkElement instantiates the element.

Note that as the timelines are processed, setter timelines with simple property paths (just a single component) are kept separate from setter timeline with complex paths. This allows the two-pass lookup for property values, described above.

CONCLUSION

As can be seen from the foregoing detailed description, there is provided a mechanism in the form of storyboards, which among other benefits eliminates the need for authors to manually synchronize on different timelines the various operations that happen during animation (e.g., start and stop times or responses to events). Further, the availability of storyboards through the styling system eliminates the need for timing information to have to be applied to each animation or media element individually.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

Each of the patent applications referred to herein are assigned to the assignee of the present invention and hereby incorporated by reference.

What is claimed is:

1. In a computing system for processing of graphical or other audiovisual information for display to a user of the computing system, a method of coordinating various timing for different animation properties of one or more objects to be animated using a single timeline to coordinate the various timing of the different animation properties instead of defining the change of each animation over time individually, thus enabling creation of animations that are synchronized with one another in a more straightforward manner, the method comprising:

generating at a high-level composition and animation engine a hierarchical element tree that represents a graphics scene provided by an application program or other high-level program, each node of the tree representing one or more animation components for an object to be animated in the graphics scene;

generating at the high-level composition and animation engine a hierarchical clock tree that represents the coordinated timing and synchronization for the different animation properties of the one or more objects to be animated in the graphics scene, each node of the hierarchical clock tree representing timing for certain animation properties of an object, and each level of the hierarchical clock tree remaining in synchronization with one another;

integrating at the high-level composition and animation engine the element and clock trees by linking at least some of the nodes of the element tree representing animation components for an object to be animated in the graphics scene with at least some of the nodes of the clock tree representing timing for the linked animation components of the element tree, thus providing coordination of otherwise independent timelines affecting a variety of animation components so that the timing for different properties of different animation components is controlled and synchronized by the timing provided at the different levels and nodes of the clock tree, and which is ultimately synchronized by the timing provided at the top most level in the clock tree;

using a state machine in the form of an event list generator at the high-level composition and animation engine, generating an event list from the clock tree once it is integrated with the element tree, the event list grouping events that were initially scheduled by the linked animation components and timing clocks of the two trees so that there is an event list corresponding to each independent animation or animation set;

using an interval generator at the high-level composition and animation engine, preparing for each animation or animation set of the event list a corresponding interval that is compiled into an interval list; and receiving the interval list at a low-level composition and animation engine and inputting the interval list to a low-level computation engine which in turn generates an output that is then used by a graphics subsystem to render and display the animated scene.

2. In a computing system for processing of graphical or other audiovisual information for display to a user of the computing system, a computer program product comprising a computer storage medium containing computer-executable instructions for causing the computing system to implement a method of coordinating various timing for different animation properties of one or more objects to be animated using a single timeline to coordinate the various timing of the different animation properties instead of defining the change of each animation over time individually, thus enabling creation of animations that are synchronized with one another in a more straightforward manner, and wherein the method is comprised of:

generating at a high-level composition and animation engine a hierarchical element tree that represents a graphics scene provided by an application program or other high-level program, each node of the tree representing one or more animation components for an object to be animated in the graphics scene;

generating at the high-level composition and animation engine a hierarchical clock tree that represents the coordinated timing and synchronization for the different animation properties of the one or more objects to be animated in the graphics scene, each node of the hierarchical clock tree representing timing for certain animation properties of an object, and each level of the hierarchical clock tree remaining in synchronization with one another;

integrating at the high-level composition and animation engine the element and clock trees by linking at least some of the nodes of the element tree representing animation components for an object to be animated in the graphics scene with at least some of the nodes of the clock tree representing timing for the linked animation components of the element tree, thus providing coordination of otherwise independent timelines affecting a variety of animation components so that the timing for different properties of different animation components is controlled and synchronized by the timing provided at the different levels and nodes of the clock tree, and which is ultimately synchronized by the timing provided at the top most level in the clock tree;

using a state machine in the form of an event list generator at the high-level composition and animation engine, generating an event list from the clock tree once it is integrated with the element tree, the event list grouping events that were initially scheduled by the linked animation components and timing clocks of the two trees so that there is an event list corresponding to each independent animation or animation set;

using an interval generator at the high-level composition and animation engine, preparing for each animation or animation set of the event list a corresponding interval that is compiled into an interval list; and receiving the interval list at a low-level composition and animation engine and inputting the interval list to a low-level computation engine which in turn generates an output that is then used by a graphics subsystem to render and display the animated scene.

3. The method of claims 1 or 2 wherein integrating the element and clock trees by linking at least some of the nodes of the element tree representing animation components for an object with at least some of the nodes of the clock tree representing timing for the linked animation components of the element tree is performed by using extensible application markup language.

4. The method of claims 1 or 2 wherein at least some of the nodes of the clock tree represent timing data from a style associated with an element.

5. The method of claims 1 or 2 wherein generating an event list from the clock tree once it is integrated with the element tree comprises instantiating a clock object that maintains an overall storyboard timeline information.

6. The method of claim 5 wherein instantiating said clock object that maintains an overall storyboard timeline is performed by starting the storyboard timeline in response to a trigger.

7. The method of claim 6 wherein the trigger corresponds to a property trigger, and wherein starting the storyboard timeline comprises evaluating a state of the property trigger.

8. The method of claim 6 wherein the trigger corresponds to an event trigger, and wherein starting the storyboard timeline comprises detecting an event fired by the event trigger.

9. The method of claim 6 wherein the trigger corresponds to an enter/exit trigger and wherein starting the storyboard timeline comprises evaluating a state of the property trigger for an enter event.

10. The method of claims 1 or 2 further comprising modifying a sub-property of a target element in a complex property path of the hierarchical element tree.

11. The method of claim 10 wherein modifying the sub-property comprises establishing a property value for the target element, and then modifying the sub-property value.

12. The method of claim 11 wherein establishing said property value for the target element comprises searching for the property value based on conflict resolution ordering.

13. The method of claim 10 wherein modifying the sub-property value comprises determining a base value from which to change the sub-property value.

* * * * *